United States Patent [19]

Fromenteau et al.

[11] Patent Number: 5,907,633
[45] Date of Patent: May 25, 1999

[54] METHOD FOR THE FAST RECOGNITION OF OBJECTS LIKELY TO FORM PART OF A COLLECTION COMPRISING A LARGE NUMBER OF OBJECTS WITH DIFFERENT CHARACTERISTICS

[75] Inventors: Jean-Claude Fromenteau, Drancy; Christian Riviere, Nantes, both of France

[73] Assignee: Thomson-CSF, Puteaux, France

[21] Appl. No.: 08/264,766

[22] Filed: Jun. 23, 1994

Related U.S. Application Data

[63] Continuation of application No. 08/117,340, Sep. 7, 1993, abandoned, which is a continuation of application No. 07/697,620, May 9, 1991, abandoned.

[30] Foreign Application Priority Data

May 22, 1990 [FR] France ................................ 90 06386

[51] Int. Cl.⁶ .................................................... G06K 9/62
[52] U.S. Cl. ........................................................ 382/209
[58] Field of Search ................................ 382/155, 156, 382/157, 160, 209, 217, 218, 219, 220, 221, 222, 224, 225, 226, 227, 228

[56] References Cited

U.S. PATENT DOCUMENTS

| | | | |
|---|---|---|---|
| 4,040,011 | 8/1977 | Crane et al. | 382/34 |
| 4,241,329 | 12/1980 | Bahler et al. | 382/39 |
| 4,543,660 | 9/1985 | Maeda | 382/36 |
| 4,658,429 | 4/1987 | Orita et al. | 382/36 |
| 5,058,180 | 10/1991 | Khan | 382/36 |
| 5,060,276 | 10/1991 | Morris et al. | 382/48 |
| 5,133,023 | 7/1992 | Bokser | 382/36 |

FOREIGN PATENT DOCUMENTS 2456210  8/1976  Germany .

OTHER PUBLICATIONS

Proceedings of the IEEE 1989 National Aerospace and Electronics Conference NAECON 1989, Dayton, US, May 22–26, IEEE, US vol. 2, pp. 940–947: G.F. Wilber, et al. "Intelligent Real–Time Electronic Warfare".

*Primary Examiner*—Jose L. Couso
*Attorney, Agent, or Firm*—Oblon, Spivak, McClelland, Maier & Neustadt, P.C.

[57] ABSTRACT

To carry out a fast recognition of objects, for example during a sorting operation, the measured parameters of these objects are divided into several classes. A rough sorting operation is done, taking account of the main classes. Then, for each class, the partial likelihoods of the measured parameters are measured and, finally, the overall likelihood is determined.

13 Claims, 1 Drawing Sheet

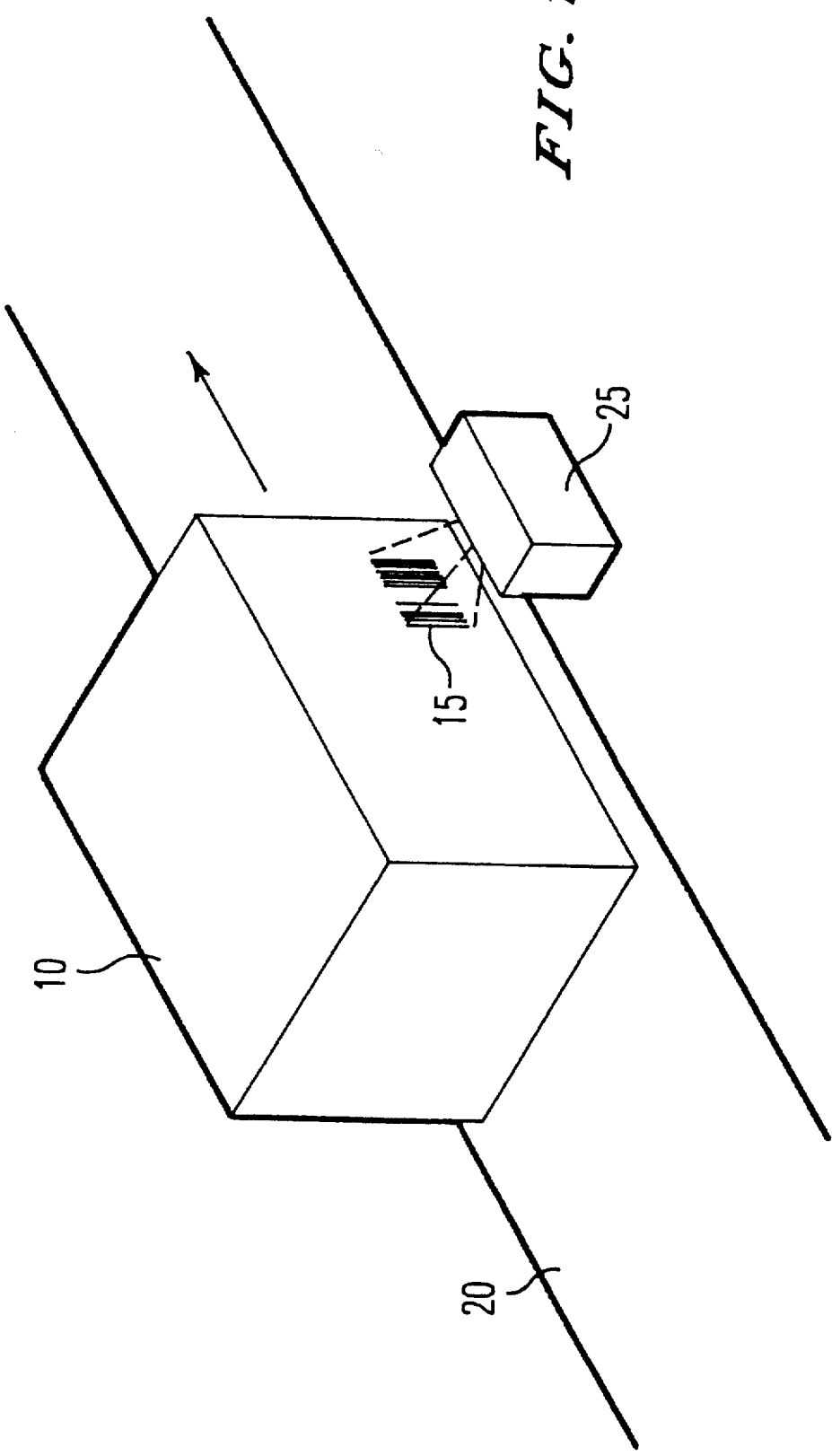

1

METHOD FOR THE FAST RECOGNITION OF OBJECTS LIKELY TO FORM PART OF A COLLECTION COMPRISING A LARGE NUMBER OF OBJECTS WITH DIFFERENT CHARACTERISTICS

This application is a Continuation of application Ser. No. 08/117,340, filed on Sep. 7, 1993, now abandoned, which is a Continuation of application Ser. No. 07/697,620, filed May 9, 1991, abandoned.

BACKGROUND OF THE INVENTION

1. Field of the Invention

The present invention relates to a method for the fast recognition of objects likely to form part of a collection comprising a large number of objects with different characteristics.

2. Description of the Prior Art

When objects of a same type, moving at high speed and in large numbers past a control station, have to be identified in order to be subsequently sorted out, the task of identification is generally performed by a human operator. To make it possible to automate an identification operation of this type, these objects have to be provided with a prior marking. This marking may be done, for example, by means of a bar code, as is being done already for mail sorting operations. To carry out this bar code marking speedily, in other words to justify the automation of the sorting operation, an operation of optic recognition has to be performed on the characters of the address written on a letter. This optic recognition is subject to high error rates if the address is handwritten. For example, as is shown in FIG. 1, an object 10 can move on a conveyor belt 20. This object 10 will have a bar code or similar readable marking 15 placed thereon, which can be read by ban optic recognition unit 25.

The objects to be identified may also be provided with "electronic labels", but this cannot always be done and may be too expensive if a large number of objects have to be sorted out.

Should the objects to be identified be differentiated by physical characteristics (such as dimensions, color, weight), electrical characteristics (such as dielectric permittivity), magnetic characteristics (such as permeance) or optic parameters (such as reflectivity, opacity etc.), a expert recognition systems may be used, but when these physical characteristics vary little from one object to another and/or when these objects file past swiftly and in large guantities, these expert systems are likely to be very complicated and costly.

When these objects are radars, some of whose technical parameters (transmission frequency, pulse width, scanning characteristics etc.) have been measured, the results of the measurements and of the analysis of their parameters have to be compared with a library of characteristics. This library contains a description of already identified radars (the description of which is known by other means), a and their modes of operation.

The known methods of identification of radars can be divided roughly into two main categories. The first category encompasses methods for comparing the variables measured with ranges (minimum, maximum) stored in a library, and for comparing discrete parameters. Such methods require the prior setting up of the libraries taking account of both the performance characteristics of the sensors that have given the variables measured and the ranges of variation of the parameters of the radars. Furthermore, these methods lead to the excessively severe exclusion of modes when the comparisons with the values of the libraries are not satisfactory, and this is the case chiefly for the secondary parameters and, above all, for the discrete parameters. In addition, these methods exhibit little flexibility in the weighting of the discriminating character of the different parameters. Furthermore, the digitization of the result is difficult. This is detrimental to the performance characteristics. It is also not possible to interpret the degree of confidence that is to be placed in the result.

The known systems belonging to the second category use powerful expert systems based on the principle of the enriching of a library as and when the results of measurements are acquired. This method has a very low speed of execution and its implementation requires very large-sized memories which may exclude its use in the case of on-board identification systems.

SUMMARY OF THE INVENTION

An object of the present invention is a method for the identification of objects that is simple to implement and can be speedily carried out, gives results independent of the precision of the measuring sensors, can be easily adapted to all situations and does not require a large amount of memory.

The invention relates to a method for the fast recognition of objects likely to form part of a collection of a large number of objects with different characteristics, this method consisting in the measurement of the parameters representing the main characteristics of these objects, and in the carrying out, by means of a processor, of the following steps: the distribution, among several classes, of the measured parameters representing the main characteristics of these objects, the carrying out of a first rough sorting operation taking account of the order of magnitude of the main parameters of the main classes, the elimination of the least likely solutions in each class, and the classification of the remaining solutions according to the order of likelihood in order to choose the most likely solution (or solutions), wherein the likelihood is an overall likelihood that is equal to the product of the partial likelihoods relating to the different classes, a partial likelihood ($V_p$) being given by:

$$V_p = \pi_j (C(j)^{K(j)} N(j))$$

where "j" is the index of exploration of the parameters associated with the class for which $V_p$ is the likelihood,

- C(j) is a variable which, when it approaches unity, represents the growing proximity of the parameter with that of the mode memorized in a library,
- N(j) is a coefficient making it possible to fix the weight of the parameter j in the identification,
- −K(j) is a coefficient that is equal to 1 for the values of parameters, the precision of which is known in terms of percentage, and is proportional to the value of the parameters when their precision is known in absolute terms.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

FIG. 1 shows a prior art system over which the present invention is an improvement.

DETAILED DESCRIPTION OF THE INVENTION

The identification method of the invention is described here below with reference to pulse radars, but it can clearly be applied also to CW radars which are generally simpler to identify, and it is clear that, in general, it can be applied to a very wide variety of objects, the characteristics of which can be measured by means of appropriate sensors.

The method consists first of all, as shown in FIG. 2, in the distribution of the technical parameters measured among several classes (see step S5). Advantageously, there are four of these classes. In this case, these classes are respectively related to the radar transmission frequency, the pulse width, the modulation of the incoming time and the scanning. The first two classes mentioned above are called "primary" classes because they relate to the pulses emitted by the radars. The other two classes are called "secondary" classes because they relate to several pulses. For example, the class of "modulation" parameters is formed by the observed minimum and maximum values, the most frequently occurrent value and the number of values observed.

Each class of parameters is first of all assigned a grade representing the estimation of the quality of the measurement that has to be exploited (see step S10), hence the confidence that can be reasonably placed in it The grade represents a precise value for the primary parameters (quantitative parameters) and a more subjective notion of confidence for the secondary parameters (which have a qualitative character).

A technical parameter is either a discrete characteristic or a physical variable For example, the class of parameters describing the scanning is formed, firstly, by the type of scanning (circular, sectorial etc.) and, secondly, by the antenna rotation period and the width of the lobe.

The first step of the identification method of the invention is a rough sorting operation (see step S15), equivalent to a screening operation This sorting operation takes account of the order of magnitude of the primary parameters, namely pulse width and frequency parameters, which are always measured with a known precision and have a reliable order of magnitude: these are easily discriminant parameters.

A first list of possible radars (the pulse width and frequency characteristics of which correspond, in a certain range of values, to the measured characteristics) is thus chosen. It is called the "search field". This list contains radar modes that deserve to be examined, and all the subsequent operations will relate only to this search field. According to one exemplary embodiment, for a library containing about 4000 radar modes, this search field generally has 80 to 100 modes at most and, in the most unfavorable cases, about 200 modes at most.

In the next step, the secondary technical parameters of the measured radar are examined (see step S20), and indicators characterizing the radar signal are positioned. These indicators are positioned when a characteristic of the radar measured has been determined with quasi-certainty. For example, with respect to the scanning, an indicator is positioned at a certain value A if it is of the circular type with two ARPs (antenna rotation periods), it is positioned at another value B if it is sectorial with two stops, at a third value C if it is circular with one ARP etc.

Once all the indicators that can be positioned have been positioned, the identification process is common for the examination of the entire search field. Thus, for example, the observation of the parameters of the "modulation" class makes it possible to estimate the difference between the values of lags between pulses measured and the spread of these values, and it is therefore possible to estimate whether the modulation is a simple one of the wobbulation stagger or "jitter" type or in the form of pulse trains, multiple modulations, etc.

Then, depending on the different indicators mentioned above, for each of the modes of the search field, variables known as "likelihoods" are computed (see step S25). These variables qualify the distance between the mode examined (the mode forming part of the search field) and the measurement to be identified.

The likelihoods computed are of two types: partial likelihoods each relating to a class of parameters and a overall likelihood relating to all the classes of parameters. These classes of parameters relate respectively to the frequency, the pulse width, the modulation and the scanning.

For each of the likelihoods, four (in the present case) minimum levels of likelihood are determined according to the following general principle: greater indulgence (low minimum level required) for a class of parameters having a wrongly graded measurement even if this should entail a higher requirement (higher maximum level required) for the other classes.

Hence, for each mode of the field of research, the partial likelihood of the different classes of parameters and then the total likelihood are determined. The modes finally chosen are, if they exist, the modes (four of them in practice) coming from the search field having the best overall likelihoods and for which all the partial likelihoods are greater than the minimum levels required.

The overall likelihood (V(i)) of a radar mode (i) in relation to the measurement to be identified is defined by the following formula:

$$V(i) = Vli(i) \cdot Vf(i) \cdot Vmod(i) \cdot Vb(i)$$

wherein Vli(i), Vf(i), Vmod(i)·Vb(i) are respectively the partial likelihoods of each of the classes of technical parameters relating to the pulse width, frequency, modulation and scanning.

The partial likelihoods $V_p$ are real numbers 0 to 1 and are described by the general formula:

$$V_p = \pi_j (c(j)^{K(j)}) N(j)$$

wherein:

"j" is the index of exploration of the parameters associated with the class for which $V_p$ is the likelihood For example, the class of "frequency" parameters is formed by the most frequently occurrent measurement, the number of values observed and the minimum and maximum values of the frequency (j therefore varies from 1 to 4 in the present case).

C(j) is a variable which, when it approaches unity, expresses the growing proximity of the parameter analyzed with that of the mode memorized in a library.

N(j) is a coefficient that makes it possible to fix the weight of the parameter "j" in the identification. The weight increases when N(i) increases, and N(J) depends on the discriminating character of the measurement.

K(j) is a coefficient that is equal to 1 for the values of parameters, the precision of which is known in terms of percentage, and is proportional to the value of the parameters when their precision is know in terms of absolute value. Thus, for examples if a frequency F of 5000 MHz is measured, and, if the closest frequency of the modes of the library is 5020 MHz we have:

$$C(j) = \frac{5000}{5020} = 0.996$$

C(j) being defined here below:

$$K(j)=F(F \text{ in GHz})=5$$

whence $C(j)^{K(j)}=0.996^5=0.98$

And if the frequency measured were to be 10,000 MHz and that of the library were to be 10,6020, then we would have:

$$C(j)^{K(j)}=0.998^{10}=0.98$$

From this example, it is deduced that a difference of 20 MHz is as discriminating at 5000 MHz as it is at 10,000 MHz. This is coherent with the fact that the frequency is characterized with absolute precision.

The formula of $V_p$, given here below, and especially the list of parameters (j), depends on the prior examination of the measurement as far as the secondary parameters are concerned. Thus, for example, in the case of the modulation, the formula of Vmod ($V_p$ relative to the modulation) could be different in different cases ("stagger", "jitter", wobbulation etc.) as a function of the meaning and confidence attached to the determining of the different parameters relating to this class. Furthermore, this type of modulation becomes a parameter in its own right that is given, explicitly or implicitly, for each mode of a library.

The formula of $V_p$ also depends on the measurement. For example, with respect to the scanning, depending on whether it is sectorial or circular, the following factors come into play respectively: the type of scanning alone, the type of scanning and the antenna rotation period or else the type of scanning and the rotation period and the lobe width.

The coefficient C(j) is obtained, depending on the type of variable j processed, as follows:

a) comparison of a qualitative or discrete parameter: Cqual(j)=1 if there is correspondence, else Cqual(j)<1 b) proximity of a parameter measurement (M) to a value in a library (LV):

$$Cvv(j) = \inf\left(\frac{M}{LV}, \frac{LV}{M}\right)$$

c) proximity of a parameter measurement (M) to a possible range of a library (LVmin, LVmax):

$$Cvf(j) = \inf\left(\frac{M}{LVmin}, \frac{LVmax}{Nmax}, 1\right)$$

d) proximity of the extreme parameter values measured (Mmin, Mmax) to a possible range of a library (LVmin, LVmax):

$$Cff(j) = \inf\left(\frac{Mmin}{LVmin}, \frac{LVmax}{Mmax}, 1\right)$$

It will be noted that, should it be necessary to optimize the execution time, ($Cj^{K(j)}$ N(j)) may be replaced by 1−K(j)·N(j)+C(j)·K(j)·N(j), giving a.C(j) +b since k(j) and N(j) are independent of the modes observed. In the most unfavorable cases K(j) is proportional to the measurement if it is not equal to 1. This approximation is possible since the most promising values for C(j) are close to 1 (the best possible likelihood). It is desirable in the case of parameters of little discriminating quality (N(j) low), for it does not tend towards zero.

The partial and then overall likelihoods are computed for each of the modes of the search field and are compared with the minimum likelihoods required. The modes that do not meet these minimum levels are rejected, possibly without having been totally examined. For, according to an advantageous characteristic of the invention, when a mode goes significantly beyond the minimum threshold of overall likelihood, this threshold is re-assessed for the examination of the following modes This characteristic gives a substantial gain in time since, statistically, these following modes are rejected more quickly in the event of their having to be rejected.

Then, a final classification is made to seek the mode having the greatest overall likelihood (see step S30). If several modes (four at the most) have overall likelihoods that are very close to each other, the result is formed by these different modes.

The method described above may be implemented in a recognition system by being translated into an algorithm constituting the working program of a processor. This program may be written in a language such as the language C or in the language XRET (dedicated to expert systems) compiled in C, or in any other appropriate language. Naturally, when the recognition system is being finalized, it is necessary to set the discriminating characters accurately for all the coefficients N(j) hence for each parameter while, at the same time, equalizing the relative "weights" of the four partial likelihoods. Advantageously, it has been possible to make an a priori setting, for these four partial likelihoods, of the correspondences between the values of likelihood (expressed herein in percentages) and the intuitive notions of likelihood.

95% to 100% certain
89% to 95% possible
83% to 89% doubtful.

In the present case, these correspondences have been determined for the simplest cl ass of parameters: the pulse width, and have been imposed for the other classes, i.e. all the coefficients N(j) of the parameters of these classes have been determined in taking account of the above values.

To determine the search field, the procedure adopted uses unions and intersections of sets called "screens" that are fixed beforehand. A first screen represents the set for which the frequencies have the same order of magnitude. Another screen relates to the modes for which the pulse widths are of the same order of magnitude.

Thus, for example, the total range of frequency is cut up into about twenty "equidense" segments (each substantially including the same number of possible frequencies) and the range of pulse widths is cut up into about fifteen "equidense" segments. In both these cases, a measured mode may belong, as the case may be, to several segments. Naturally, these operations of cutting up into segments are not done randomly but are based on sound a priori knowledge of the radars.

For the two primary parameters, frequency and pulse width, a measurement includes one or more values constituting an interval. As the case may be (a single value), the minimum of the interval is equal to the maximum. This interval should then be widened to take account of the precision of the measurements: the intrinsic precision of the sensor, or specific, localized precision in the case of a low grade. The method then consists in achieving the union of the screens having a non-empty intersection with this interval, for these two primary parameters. The intersection of the result relating to the frequency and of the result relating to the pulse width gives the search field in general, the interval derived from the measurement covers only one screen: this is, naturally the aim of the method.

In practice, a screen is a list of binary information enabling the processing of the modes in big packets (for example packets of 32 for a 32-bit processor) during the operations for the unions and intersection of sets, by means of AND and OR logic instructions of the processor It is thus possible to determine the search field in a very short period of time (some milliseconds for example) The search field generally contains only one restricted subset of modes to be examined with respect to the set of modes of the library (0.5% to 10% in general), thus correlatively diminishing the time taken to carry out the subsequent operations for determining likelihoods.

Because the method of the invention makes it possible to fix minimum levels of likelihood, and above all because it makes to possible to achieve dynamic shifts in the threshold of overall likelihood, it provides for a substantial gain in time: a large number of modes may be abandoned as and when the threshold is raised, before they are completely examined. In certain cases, this gain in time may be 50%.

The parameters C(j) express a proximity and not a remoteness. By definition, they range from 0 to 1. They may therefore be programmed by means of integer variables, without any risk of overflow.

For example, the coefficient Cvv (the coefficient C(j) corresponding to the proximity of a measurement to a value of the library) is programmed in the language C as follows:

define Cvv(a,b) ((a>b)?(b<<14)/a:((a<<14/b))

the result varying from 0 to 0x4000. The programming may be simplified in a programming language having the "fixed decimal point". A computation such as this may be done in some microseconds by a standard currently existing microcomputer (with a 386 or 68 020 type microprocessor).

For a library describing 4000 radar modes, the identification of a complete measurement (i.e. one for which there are four classes of effectively measured parameters available) may generally take a time ranging from 15 to 100 milliseconds approximately, depending on the order of magnitude of the parameters measured, and this is achieved with a 68020 processor based microcomputer programmed in language C. Naturally, to accelerate the processing, several processors may be made to work in parallel.

What is claimed is:

1. A method for the fast recognition of objects likely to form part of a collection of a large number of objects with different characteristics, comprising the steps of:
    measuring a plurality of parameters representing respective main characteristics of the objects;
    distributing among several classes, including a set of selected classes, the measured parameters representing the main characteristics of the objects;
    evaluating the measured parameters of the selected classes and performing a first rough sorting operation by taking account of magnitudes of the measured parameters to generate a search field;
    performing a second sorting operation of the search field by eliminating least likely solutions in each class; and
    classifying the remaining solutions of the search field according to an order of likelihood so as to choose most likely solutions, wherein the likelihood is an overall likelihood that is equal to a product of partial likelihoods relating to each of the different classes, a partial likelihood ($V_p$) being given by:

$$V_p = \pi_j(C(j))^{K(j)}N(j))$$

where "j" is an index of exploration of the parameters associated with the class for which $V_p$ is the likelihood;
C(j) is a variable which, when it approaches unity, represents a growing proximity of the parameter with that of a mode memorized in a library;
N(j) is a coefficient making it possible to fix a weight of the parameter "j" in the identification;
K(j) is a coefficient that is equal to 1 for values of parameters which have precisions known in terms of percentage, and is proportional to values of the parameters which have precisions known in absolute terms.

2. The method according to claim 1, wherein for the comparison of a qualitative or discrete parameter, the coefficient C(j) is equal to 1 if there is correspondence, and if there is no correspondence C(j) is less than 1.

3. The method according to claim 1, wherein in a case of a parameter measurement being proximate to a value in a library, the coefficient is equal to:

$$inf\left(\frac{M}{LV}, \frac{LV}{M}\right).$$

4. The method according to claim 1, wherein in a case of a parameter measurement being proximate to a possible range of a library, the parameter C(j) is equal to:

$$inf\left(\frac{M}{LVmin}, \frac{LVmax}{Mmax}, 1\right).$$

5. The method according to claim 1, wherein in a case of extreme parameter values being measured to being proximate to a possible range of a library, the coefficient C(j) is equal to:

$$inf\left(\frac{Mmin}{LVmin}, \frac{LVmax}{Mmax}, 1\right).$$

6. The method according to claim 1, wherein when an examined mode goes significantly beyond a threshold of overall likelihood, this threshold is raised for the examination of following modes.

7. The method according to claim 1, wherein the fast recognition method is for the recognition of radars, and the classes of parameters are four in number and relate respectively to a frequency, pulse width, modulation of the incoming time and scanning of detected radars.

8. A method for the fast recognition of a radar type comprising the steps of:
    measuring parameters of a frequency, pulse width, modulation of incoming time and scanning of detected radars;
    distributing the measured parameters among primary and secondary classes, so that frequency and pulse width are primary classes of parameters and the modulation of incoming time and scanning are secondary classes of parameters;
    evaluating the measured primary parameters and performing a first rough sorting operation by taking account of magnitudes of the measured primary parameters to generate a search field;

performing a second sorting operation of the search field by eliminating least likely solutions in each class; and classifying the remaining solutions of the search field according to an order of likelihood so as to choose most likely solutions, wherein the likelihood is an overall likelihood that is equal to a product of partial likelihoods relating to each of the different classes, a partial likelihood ($V_p$) being given by:

$$V_p = \pi_j(C(j))^{K(j)}N(j)$$

wherein "j" is an index of exploration of the parameters associated with the class for which $V_p$ is the likelihood;

C(j) is a variable which, when it approaches unity, represents a growing proximity of the parameter with that of a mode memorized in a library;

N(j) is a coefficient making it possible to fix a weight of the parameter "j" in the identification;

K(j) is a coefficient that is equal to 1 for values of parameters which have precisions known in terms of percentage, and is proportional to values of the parameters which have precisions known in absolute terms.

9. The method according to claim 8, wherein for the comparison of a qualitative or discrete parameter, the coefficient C(j) is equal to 1 if there is correspondence, and if there is no correspondence C(j) is less than 1.

10. The method according to claim 8, wherein in a case of a parameter measurement being proximate to a value in a library, the coefficient is equal to:

$$inf\left(\frac{M}{LV}, \frac{LV}{M}\right).$$

11. The method according to claim 8, wherein in a case of a parameter measurement being proximate to a possible range of a library, the parameter C(j) is equal to:

$$inf\left(\frac{M}{LVmin}, \frac{LVmax}{Mmax}, 1\right).$$

12. The method according to claim 8, wherein in a case of extreme parameter values being measured to being proximate to a possible range of a library, the coefficient C(j) is equal to:

$$inf\left(\frac{M}{LVmin}, \frac{LVmax}{Mmax}, 1\right).$$

13. The method according to claim 8, wherein when an examined mode goes significantly beyond a threshold of overall likelihood, this threshold is raised for the examination of following modes.

* * * * *